United States Patent [19]
Wehle

[11] Patent Number: 5,615,379
[45] Date of Patent: Mar. 25, 1997

[54] METHOD FOR EDITING DATA STORED IN FILES IN WHICH THE FILE FORMATS ARE UNKNOWN

[75] Inventor: Cleveland P. Wehle, Herndon, Va.

[73] Assignee: Sprint International Communications Corp., Reston, Va.

[21] Appl. No.: 296,140

[22] Filed: Aug. 26, 1994

[51] Int. Cl.$^6$ ..................... G06F 17/24
[52] U.S. Cl. ..................... 395/701
[58] Field of Search ............... 395/600, 650, 395/700

[56] References Cited

U.S. PATENT DOCUMENTS

| | | | |
|---|---|---|---|
| 4,455,624 | 6/1984 | Haag et al. | 395/161 |
| 4,479,197 | 10/1984 | Haag et al. | 395/159 |
| 4,538,225 | 8/1985 | Banks et al. | 395/375 |
| 5,189,608 | 2/1993 | Lyons et al. | 364/408 |
| 5,210,824 | 5/1993 | Putz et al. | 395/145 |
| 5,410,686 | 4/1995 | Kish | 395/575 |
| 5,537,592 | 7/1996 | King et al. | 395/600 |

Primary Examiner—Kevin A. Kriess
Assistant Examiner—John Q. Chavis
Attorney, Agent, or Firm—Kenyon & Kenyon

[57] ABSTRACT

A software tool enables a software developer to quickly access, report and modify data. This tool allows the user to open a file, and read, write, update and delete records in that file. The user is also able to search for a string of as many as thirty ASCII characters, as well as to perform the search in hex, decimal or binary. A user can change occurrences of one string to another string. The contents of a file can easily be displayed and printed in either ASCII, hex, decimal or binary. One can also alter the contents of a file in ASCII, hex, decimal or binary. Particular records with a file or entire files can be easily encrypted or decrypted. One can easily load, alter and invoke frequently used commands, function keys and macros. Creating and executing files containing multiple commands of the editor of the present invention is facilitated. In addition, the user can access DDL dictionary files to create reports and to locate files. Finally, a user can create simple or compound queries for searching files through the user of IF <relational condition> THEN <desired action> in combination with the boolean logic functions AND, OR and NOT.

25 Claims, 8 Drawing Sheets

METHOD FOR EDITING DATA STORED IN FILES IN WHICH THE FILE FORMATS ARE UNKNOWN

BACKGROUND OF THE INVENTION

The present invention relates generally to file editors, and more particularly to a file editor in which the file format or the file content is generally unknown.

When the contents of a file need to be accessed, reported and even modified, a software developer may often be required to spend a minimum of a day or more to write, test, and implement a software tool for that purpose. In many instances, either the software developer does not have the time to spend answering the request, or the timeliness of the response is critical.

While editors for editing binary data exist, they are awkward to use and require the user to know where the data resides to edit this binary data. Furthermore, these editors do not work with different file types, e.g., program files and non-binary data files. Therefore, a different editor would be required if a user desired to edit several different types of files.

The present invention is directed to the problem of developing a universal software tool that enables a software developer to quickly access the contents of a file, whether the file contains data, text or programs, to edit the file and to display the contents of the file in any format that is convenient to the user. The present invention is also directed to the problem of developing such an editor that works with all structures of files, and file formats for each system.

SUMMARY OF THE INVENTION

The present invention solves this problem by providing a software tool that enables the user to display the contents of a file in binary, hexadecimal, decimal, or ASCII. In addition, the software tool enables the user to modify data in one or more bits at a time.

In an advantageous embodiment of the present invention, the user is able to build compound search and replace queries through the logical terms IF, AND, THEN, OR and NOT. The search and replace queries are capable of being performed in binary, hexadecimal, decimal, or ASCII characters.

Another feature of the present invention provides the user capability of suppressing non-printable characters when displaying files in ASCII. This prevents the computer from attempting to display non-printable characters, which can alter the configuration characteristics of the terminal or printer.

The present invention is a software tool that enables a software developer to quickly access, report and modify data. This tool allows the user to open a file, and read, write, update and delete records in that file. The user is also able to search for a string of as many as thirty ASCII characters, as well as to perform the search in hex, decimal or binary. In addition, this tool enables a user to change occurrences of one string to another string.

The present invention also enables one to display and print the contents of a file in either ASCII, hex, decimal or binary. One can also alter the contents of a file in ASCII, hex, decimal or binary.

The present invention also enables one to encrypt or decrypt entire files or particular records in a file. This allows the user to prevent unauthorized users from gaining access to files, yet permits the user to edit these type of files when necessary.

The present invention also enables one to load, alter and invoke frequently used commands, function keys and macros. This allows the user to create files that perform multiple keystrokes or commands.

The present invention also allows one to create and execute files containing multiple commands of the editor of the present invention. These files will be referred to as EDITD command files.

In addition, the present invention allows a user to access DDL (Data Dictionary Language) files to format data and create reports.

Finally, the present invention allows a user to create simple or compound queries for searching files through the user of IF-THEN statements, in combination with the boolean logic functions AND, OR and NOT.

DETAILED DESCRIPTION

The present invention is not limited to use on any particular computer system, such as the TANDEM computer system on which the present invention was developed, but would be applicable to all computers and operating systems, with only slight modifications known to one of ordinary skill in the art. While the embodiment of the present invention discussed herein was written in a computer programming language known as TAL, the present invention is not limited to TAL, but could be easily converted to most of the known computer languages, such as COBOL, BASIC, C, PASCAL, etc.

Figure 1:
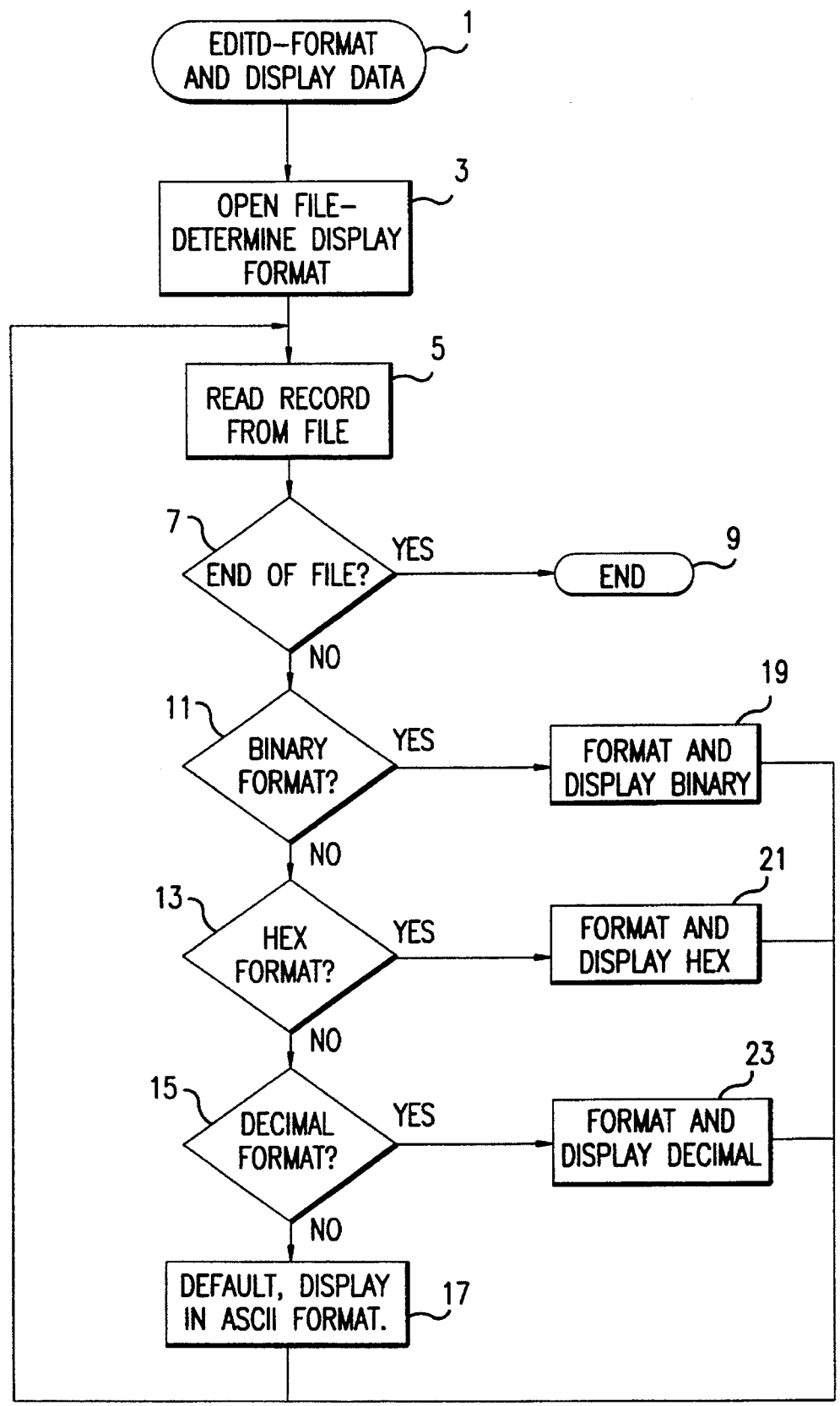
FIG. 1 depicts a flow chart of the present invention showing the flow of the editor of the present invention to display a file.

The flow chart in FIG. 1 depicts the flow of the routine to format and display the contents of a file. The start circle 1 indicates initiation of the routine, which occurs when the user invokes the GET command of the present invention. The GET command opens the data file, as indicated in functional box 3. At this point the display format is chosen by the user, either binary, hexadecimal, decimal, or ASCII display format. The record is read from the file in functional box 5. In decision box 7, the routine determines whether or not the end of file was reached. If the end of file is reached, the routine ends in end circle 9. If not, the user is successively queried as to whether to display the record in binary, hexadecimal, or decimal in decision boxes 11, 13 and 15. If a YES to any of these queries, the program flow proceeds to functional boxes 19, 21 or 23, respectively. If the answer to all of the queries depicted in decision boxes 11, 13 and 15, the software defaults to ASCII display format, which is indicated by functional box 17. The routine then returns to functional box 5 to read the next record from the file. If the user answers YES to one of the above queries in decision boxes 11, 13 and 15, the software then formats and displays the record in the chosen format in functional box 19, 21 or 23, and returns to functional box 5 to read the next record from the file.

Figure 2:
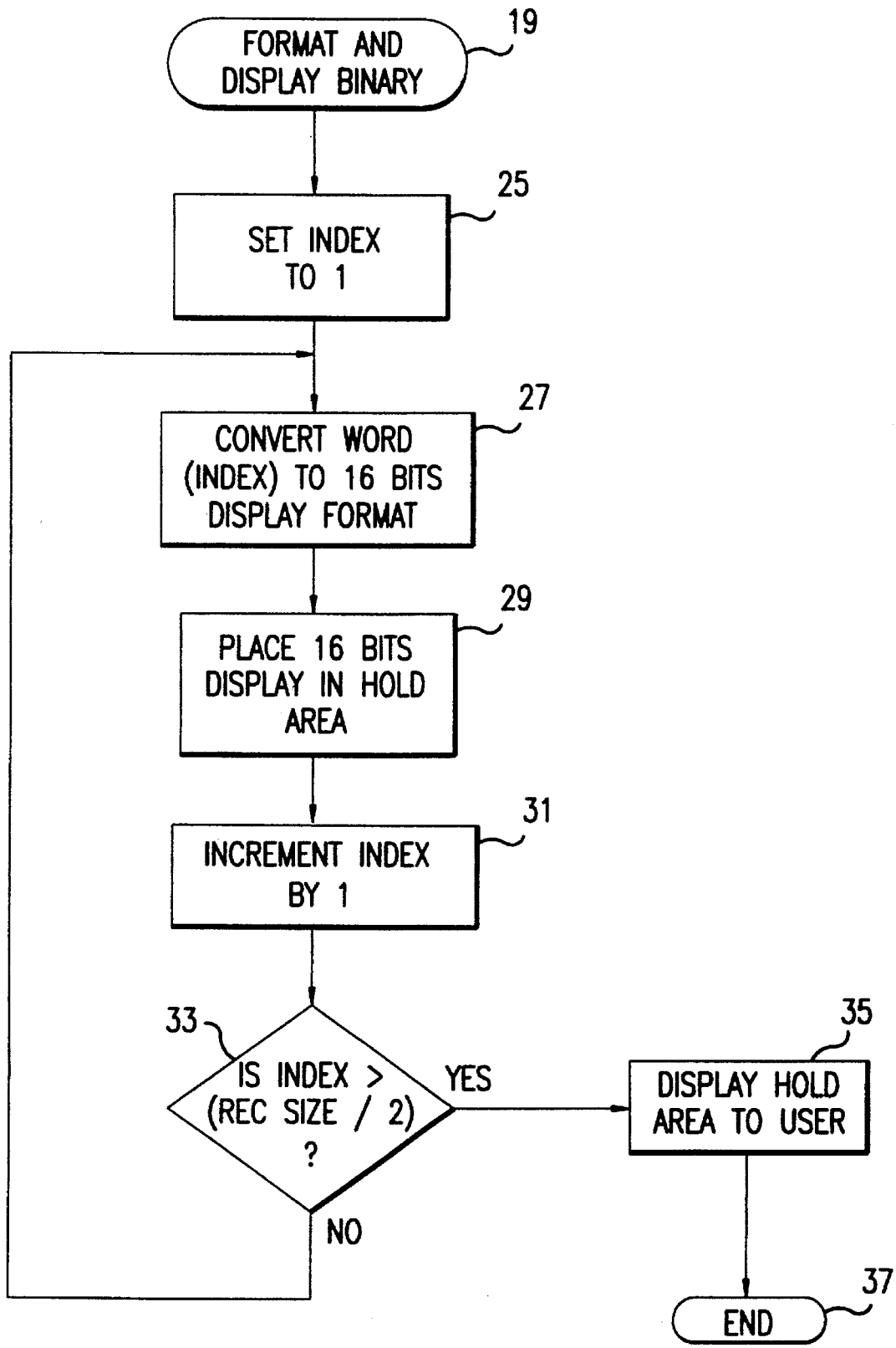
FIG. 2 depicts the flow of the routine to display binary data.

If the user chooses to display the record in binary format, the format and display binary routine 19 is invoked. Functional box 19 is depicted in greater detail in FIG. 2. In functional box 25, the index is reset to one, i.e., the place marker (index) is set to the first word in the record. Next, the word is converted to 16 bits, and formatted for display in 2 bytes in functional box 27. Each bit in the word is tested to determine on or off. For example, if the results of the test are 01101011 for the first byte and 01111110 for the second byte, then the display becomes:

01101011 01111110.

The resulting binary data is then placed in a hold area in functional box 29, until all words in the record have been converted to binary format. The index or place marker is then increased by one in functional box 31. In decision box 33, the index is then compared to half of the record size, since data is taken in two bytes per index increment. Once the index exceeds half of the record size, the hold area is displayed to the user (functional box 35), and the routine ends in end circle 37, i.e., the routine returns to functional box 5 in FIG. 1. If not, the routine returns to the step of converting the word to 16 bits display format, functional box 27.

Figure 3:
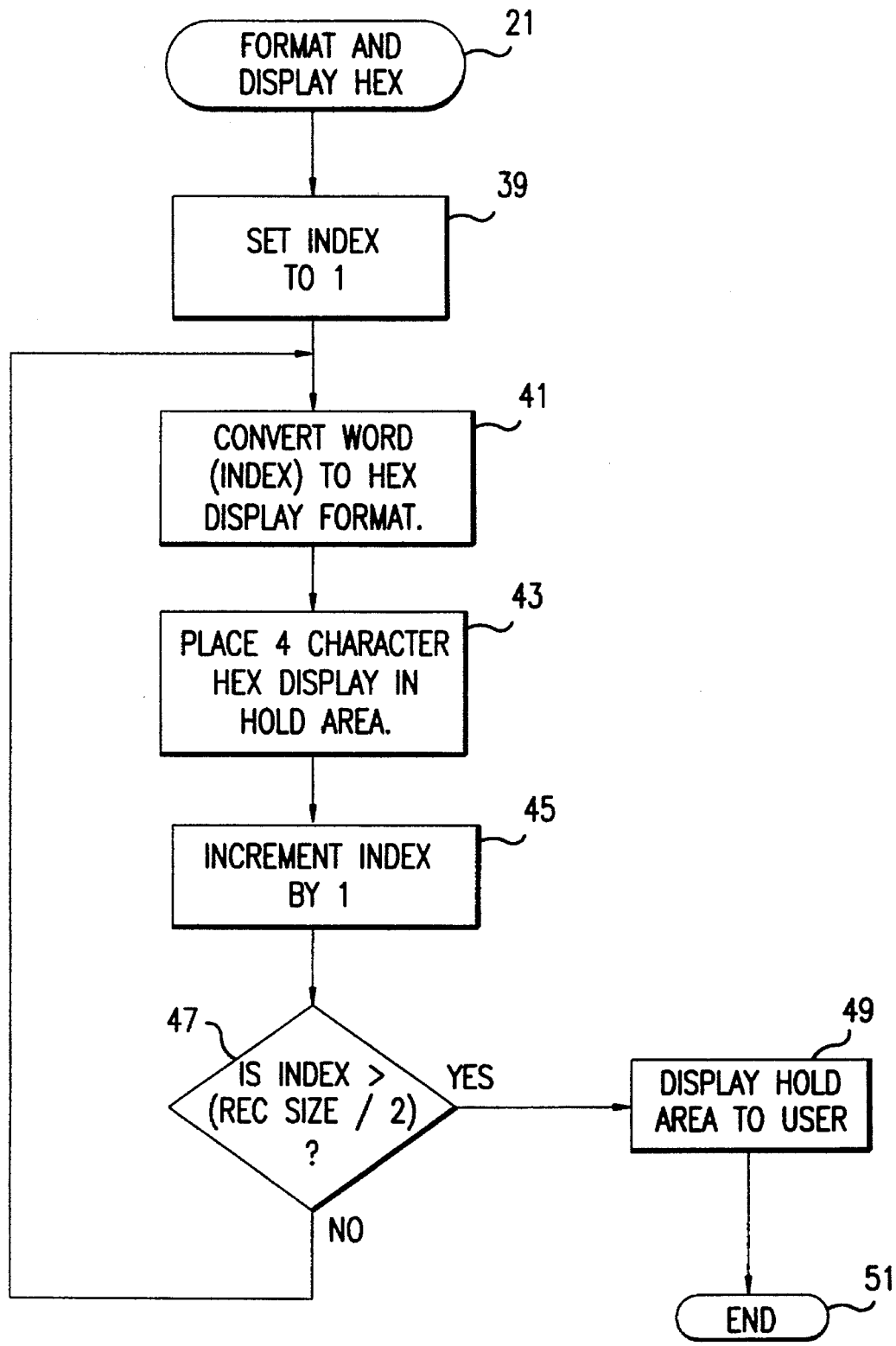
FIG. 3 depicts the flow of the routine to display hexadecimal data.

If the user chooses to display the record in hexadecimal format, the format and display hex routine 21 is invoked. Functional box 21 is depicted in greater detail in FIG. 3. In functional box 39, the index is reset to one, i.e., the place marker (index) is set to the first word in the record. Next, the word is converted to 4 character hexadecimal, and formatted for 4 character hex display in functional box 41. The content of the word is used to search an internal table of all possible HEX value representations. When the corresponding HEX value is found, it is placed in the hold area.

The resulting hexadecimal characters are then placed in a hold area in functional box 43, until all words in the record have been converted to hexadecimal format. The index or place marker is then increased by one in functional box 45. In decision box 47, the index is then compared to half of the record size, since data is taken in two bytes per index increment. Once the index exceeds half of the record size, the hold area is displayed to the user (functional box 49), and the routine ends in end circle 51, i.e., the routine returns to functional box 5 in FIG. 1. If not, the routine returns to the step of converting the word to 4 character hex display format, functional box 41.

Figure 4:
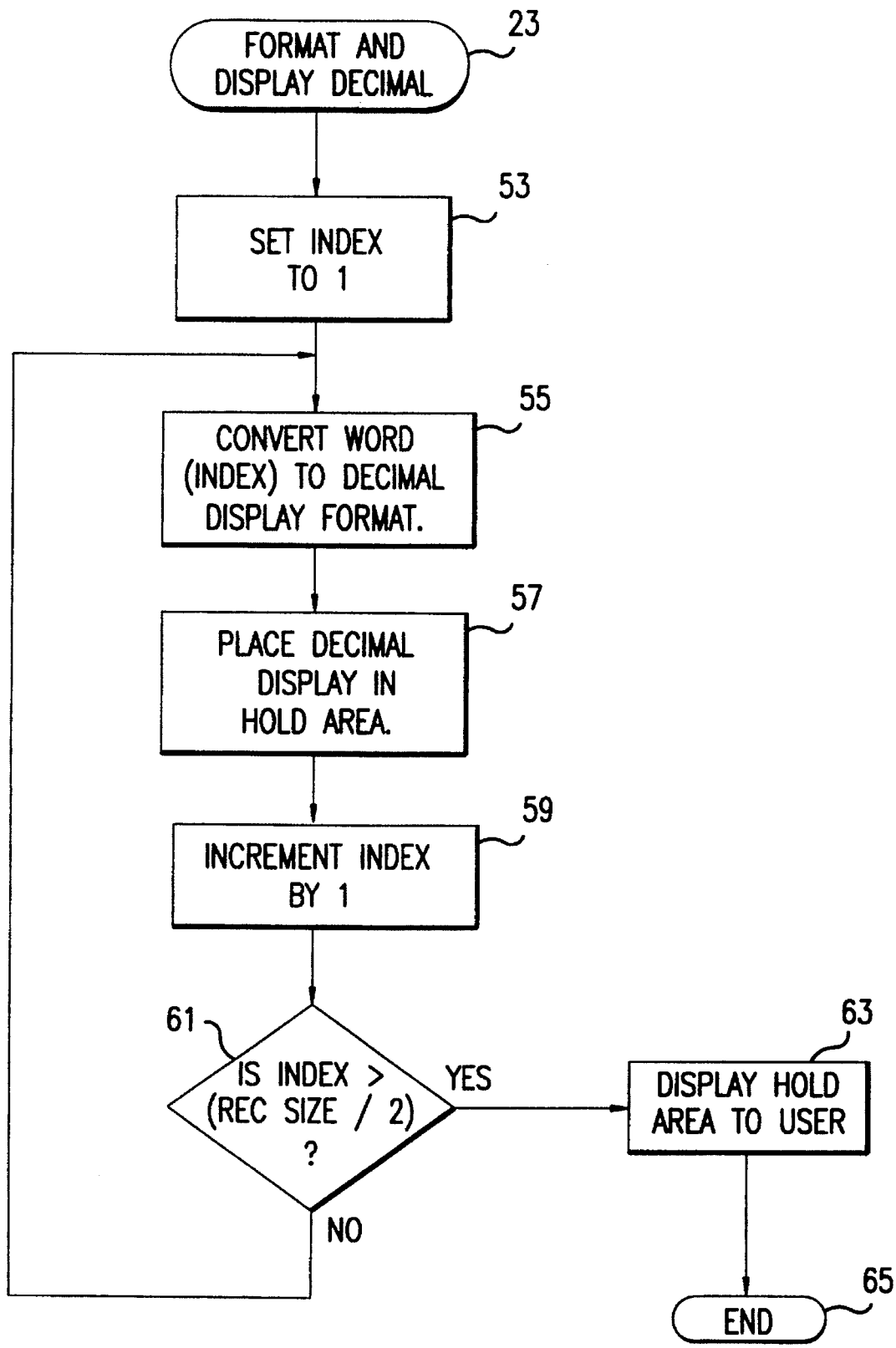
FIG. 4 depicts the flow of the routine to display decimal data.

If the user chooses to display the record in decimal format, the format and display decimal routine 23 is invoked. Functional box 23 is depicted in greater detail in FIG. 4. In functional box 53, the index is reset to one, i.e., the place marker (index) is set to the first word in the record. Next, the word is converted to its decimal representation, and formatted for decimal display in functional box 55. The contents of the word are converted to a printable ASCII representation using a Tandem library procedure called NUMOUT.

The resulting decimal representation is then placed in a hold area in functional box 57, until all words in the record have been converted to decimal format. The index or place marker is then increased by one in functional box 59. In decision box 61, the index is then compared to half of the record size, since data is taken in two bytes per index increment. Once the index exceeds half of the record size, the hold area is displayed to the user (functional box 63), and the routine ends in end circle 65, i.e., the routine returns to functional box 5 in FIG. 1. If not, the routine returns to the step of converting the word to decimal format, functional box 55.

Figure 5:
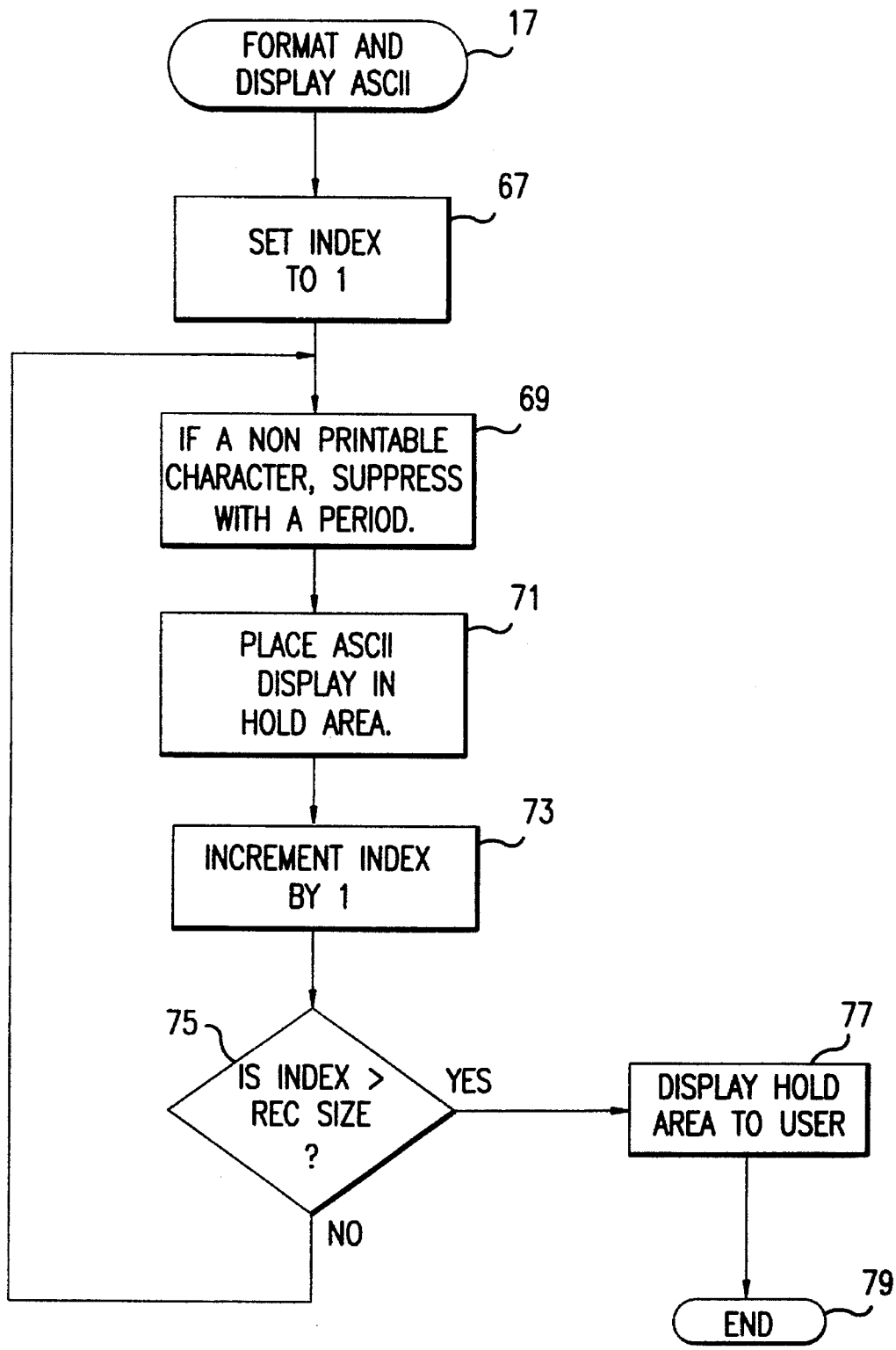
FIG. 5 depicts the flow of the default routine when the user does not choose to display binary, hex or decimal data, i.e., the routine defaults to ASCII display format.

If the user does not choose to display the record in binary, hex or decimal format, the routine format and display ASCII 17 is invoked as the default. Functional box 17 is depicted in greater detail in FIG. 5. In functional box 67, the index is reset to one, i.e., the place marker (index) is set to the first byte in the record. Next, the byte value is tested to determine if the byte value lies within the printable ASCII character set in functional box 69. If not, the ASCII character is replaced with a period, i.e., the non-printable characters are suppressed in functional box 69.

The resulting ASCII character is then placed in a hold area in functional box 71, until all words in the record have been converted to ASCII format and placed in the hold area. The index or place marker is then increased by one in functional box 73. In decision box 75, the index is then compared to the record size, since in this case data is taken in one byte per index increment. Once the index exceeds the record size, the hold area is displayed to the user (functional box 77), and the routine ends in end circle 79, i.e., the routine returns to functional box 5 in FIG. 1. If not, the routine returns to the step of converting the word to ASCII display format, functional box 69.

The present invention provides the user the capability to format a report with a variety of data representations. There are two alternatives to formatting a report. The first alternative is to refer to data elements contained in a previously compiled data dictionary listing (DDL). To use this approach, the user must first open the dictionary. To do so, the user invokes the command ?DICT. For example, to open the dictionary that resides on $LIB.TMDEVSRC and search for record definition USER-REC, the user would enter the following command:

```
< <?DICT $LIB.TMDEVSERC USER-REC
< <FORMAT USERCODE USERNAME EFF-DATE(%T)
```

INQUIRY(%B)

The second command tells the program the specifics of the format in which the data is to be displayed. The FORMAT command specifies what data elements in record USER-REC to display. The report header, length of display and type of data can be determined from the data dictionary.

The second approach allows the user to specify the files the user wishes to report, independent of the DDL. This FORMAT command allows the user to create a report independent of a DDL (where none exists). The syntax is FORMAT/USERNAME/AS A20 AT B167 FOR 20 where USERNAME is the report header, A20 describes the display as ASCII for length of 20, B167 tells what starting byte position in record USERNAME can be found and 20 tells for how many bytes to extract for display. For example,

```
< <FORMAT /USERCODE/AS A8 AT B1 FOR 8
< <FORMAT /USERNAME/AS A20 AT B167 FOR 20
< <FORMAT /EFF-DATE/AS %T AT B12 FOR 6  ! a
timestamp
< <FORMAT /INQUIRY/AS %B AT B9 FOR 1   ! a byte dis-
played in binary
    Options - (%T) (%B)
```

There are two additional display options in this example. The user may display a 48-bit timestamp in mm/dd/yy hh:mm:ss format and the user may display a byte or word in binary (e.g. 01001110).

After entering the desired Format statements, invoking the command LIST will display the specified records in the desired report format. For example, <<LIST1/2 will display records one through two:

| USER-CODE | USER NAME | EFF-DATE | | INQUIRY |
|---|---|---|---|---|
| AGF23837 | B.FRANKLIN | 12/05/56 | 15:45:23 | 00010010 |
| GWU92237 | T.JEFFERSON | 01/31/86 | 22:30:01 | 11000001 |

Figure 6:
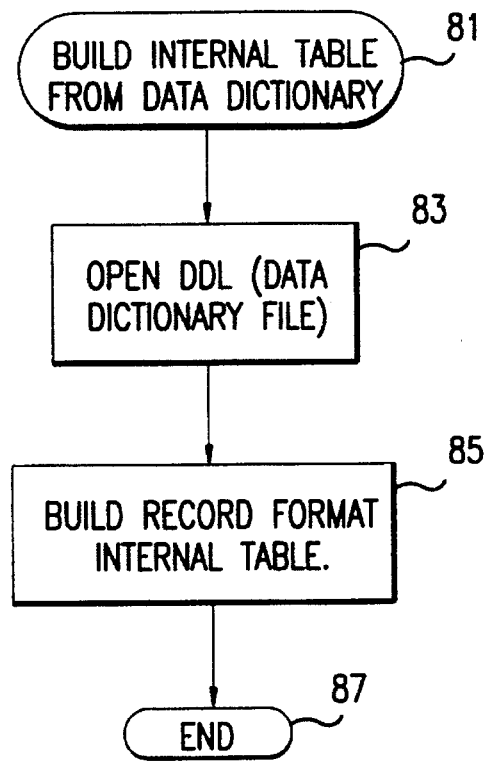
FIG. 6 depicts the flow of the routine to build an internal record table using data dictionary files.

FIG. 6 depicts the programmatic flow to build an internal record table using data dictionary files, which is functional box 81. To build an internal table from the data dictionary, the program according to the present invention processes the ?DICT command. This command enables the user to use a compiled data dictionary to format information in a report. First, the data dictionary files are opened and the user specified record is searched and read in, which occurs in functional box 83. Then, all characteristics on the record's data elements are loaded into an internal table in functional box 85. This includes element name, byte offset in record, size and internal format (e.g., alpha, numeric, integer, etc.) Now the internal record is loaded, and the routine ends in end circle 87.

Below is an example of a DDL definition of record USER-REC and its associated data elements:

```
DEF USER-REC.
02 USERCODE      PIC X(8).
02 VOLUME        TYPE BINARY 16 OCCURS 4 TIMES.
02 REC-TYPE      TYPE BINARY 8.
02 CHAR-MAP      TYPE BINARY 8.
02 FULL-NAME     TYPE BINARY 8 OCCURS 30 TIMES.
02 USERNAME      PIC X(20).
02 EFF-DATE      TYPE BINARY 16 OCCURS 3 TIMES.
02 TERM-DATE     TYPE BINARY 16 OCCURS 3 TIMES.
02 INQUIRY       TYPE BINARY 8.
02 NEWS          TYPE BINARY 9.
END.
```

Figure 7:
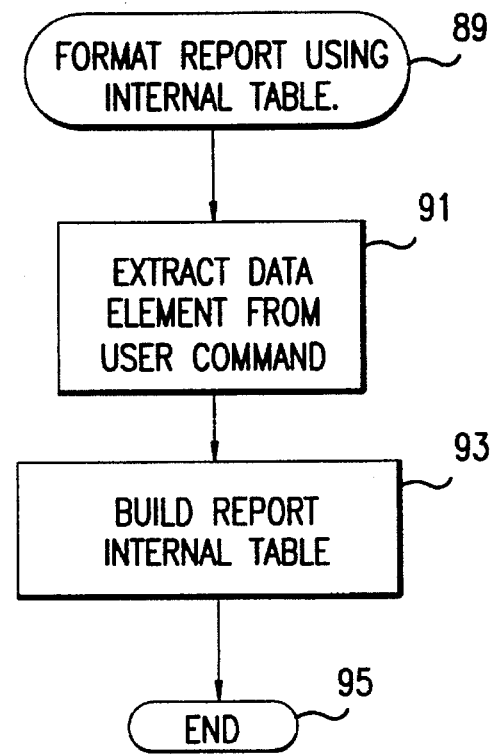
FIG. 7 depicts the flow of the routine to build an internal table using an internal record table.

FIG. 7 depicts the programmatic flow to build an internal table using an internal record table. In this case, the program according to the present invention processes one or more FORMAT commands to initiate the routine 89. Each command retrieves information relating to the user specified data element and builds an internal report table. Each data elements is extracted from the user command, i.e., the program parses for the user specified data element in functional box 91. To build the internal report table, the program searches the internal table for any user specified data element and builds an internal report table entry with related information in functional box 93. The internal report table will only contain those elements that the user wishes to report. Now the internal report table is loaded and the routine ends in end circle 95.

Figure 8:
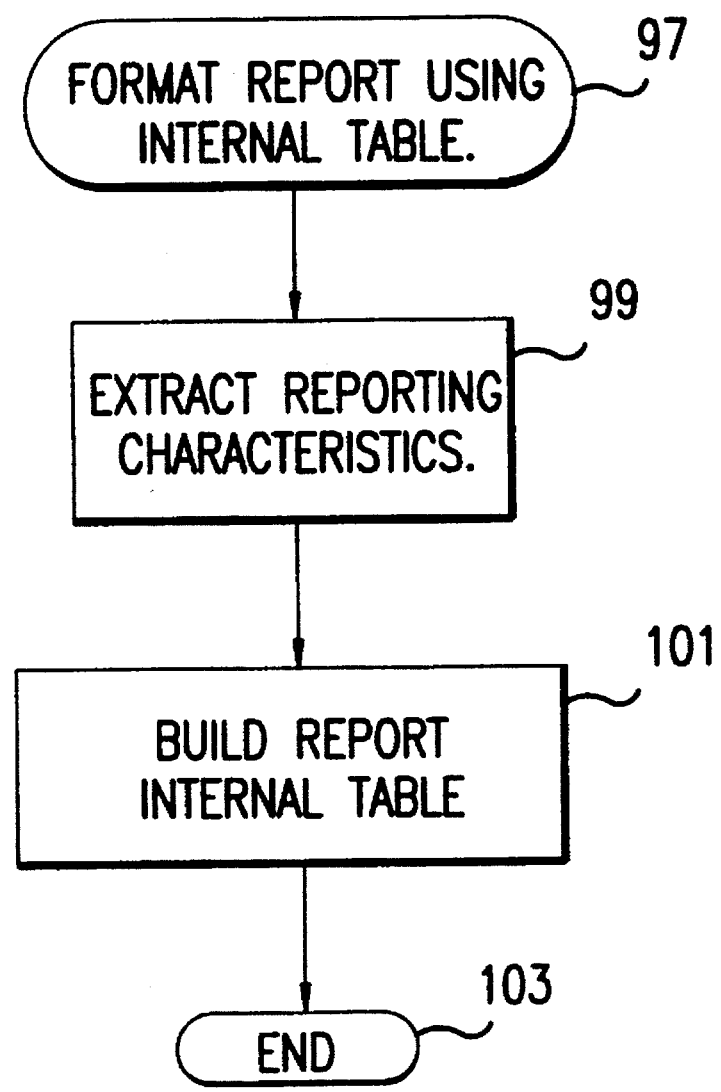
FIG. 8 depicts the flow of the routine to build an internal report table from user specified format criteria.

FIG. 8 depicts the programmatic flow to build an internal report table from user specified format criteria. One or more FORMAT commands are processed, each of which initiates the format report using internal table routine 99. Each command provides information necessary in order to build the internal report table in functional box 101. This table is subsequently used when generating a report. The reporting characteristics are then extracted by parsing for user specified data dement characteristics in functional box 99. For example,

FORMAT /USERCODE/ AS A8 AT B1 FOR 8 commands the program to create an internal report table entry with a single heading as USERCODE. The display characteristics are alphanumeric for 8 bytes. The location of the element in the record is byte 1, and the length of the element in the record is 8 bytes. Once the internal report table is loaded, the routine ends in end circle 103.

Figure 9:
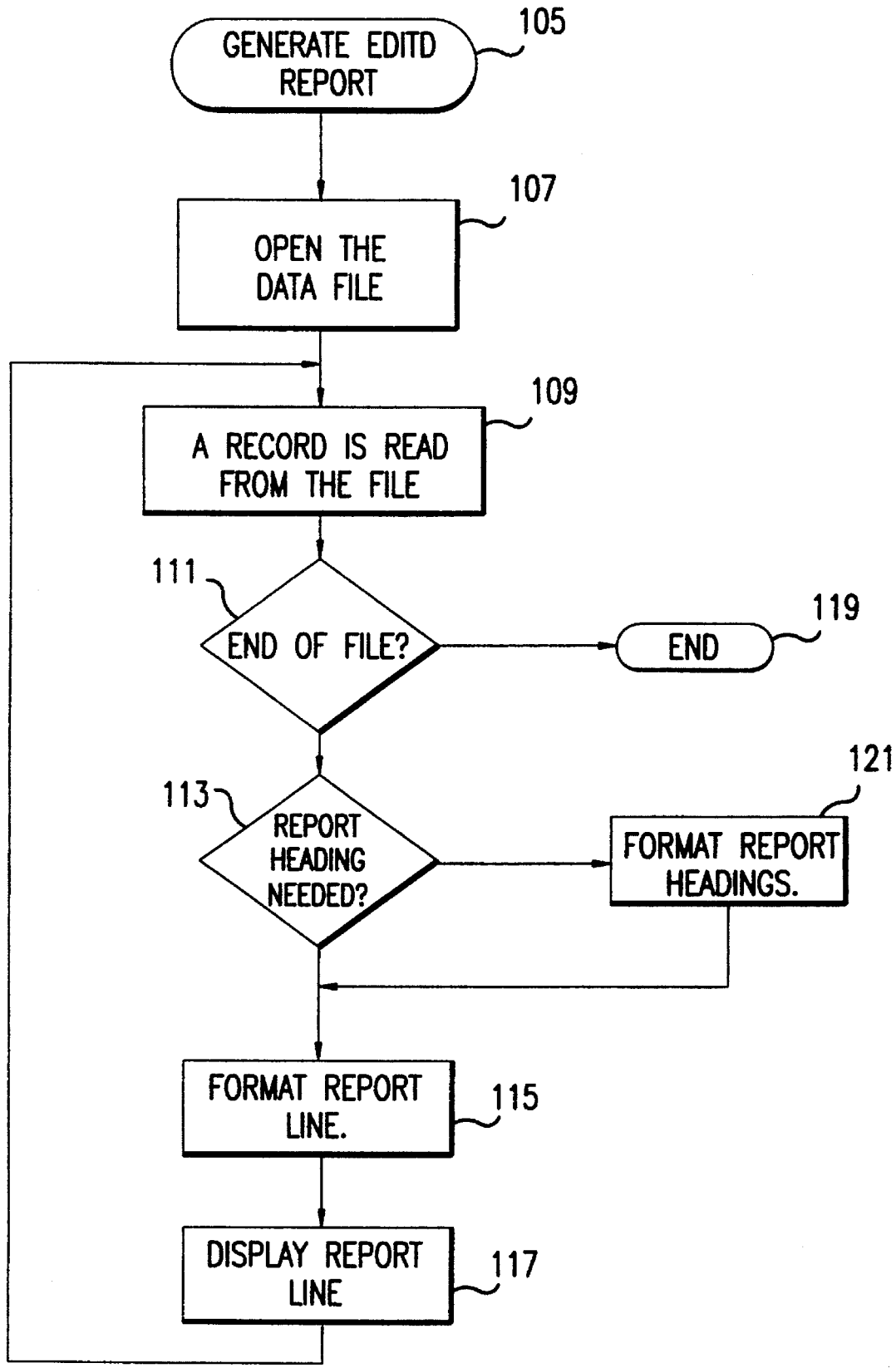
FIG. 9 depicts the flow of the routine to generate a report.

FIG. 9 depicts the programmatic flow to generate a report, functional box 105. The user opens a data file and lists one or more records. Since the user previously invoked the FORMAT command, the data is formatted according to the internal report table entries. Using the GET command, the user opens the file they wish to report in functional box 107. The user specifies what records to list a record is then read from the file in functional box 109. In decision box 111, it is determined whether or not the end of file is reached. If the end of file is reached, then the routine ends in end circle 119. If not, the routine queries the user as to whether a heading is needed in decision box 113. If so, the program formats the report headings in functional box 121. Report headings are written at the top of the page. The headings are formatted using the data element name stored in the internal report table. Then, the routine returns to functional box 115. If no heading is needed, the program formats the report line in functional box 115. The data is extracted from the current record and formatted using the criteria stored in the internal report table in functional box 115. This includes the byte offset, size and internal format. Then, the report line for the current record is displayed to the user in functional box 117. The program then returns reading the record from the file in functional box 109.

What is claimed is:

1. A method for editing computer files containing unknown data, said method comprising the steps of:

a) opening a user specified computer file;

b) choosing by the user between binary, hexadecimal, decimal as a desired display format;

c) reading a record from the user specified computer file;

d) exiting if detecting an end of file;

f) formatting and displaying binary data if binary format was chosen in step b);

g) formatting and displaying hexadecimal data if hexadecimal format was chosen in step b);

h) formatting and displaying decimal data if decimal format was chosen in step b);

i) formatting and displaying ASCII data if binary, hexadecimal or decimal format was not chosen in step b); and j) returning to step c).

2. The method according to claim 1, wherein said step f) of formatting and displaying binary data further comprises:

(i) setting a place marker to a first word in the record;

(ii) converting a word at a position indicated by the place marker to a sixteen bit binary display;

(iii) placing the sixteen bit binary display in a hold area;
(iv) incrementing the place marker by one;
(v) determining whether the place marker is greater than half of a record size;
(vi) displaying the hold area and exiting if the place marker is greater than half of the record size; and
(vii) returning to step (ii) if the place marker is not greater than half of the record size.

3. The method according to claim 2, wherein said step (ii) of converting the word further comprises testing each bit in the word to determine whether the bit is a one or a zero.

4. The method according to claim 1, wherein said step g) of formatting and displaying hexadecimal data further comprises:
(i) setting a place marker to a first word in the record;
(ii) converting a word at a position indicated by the place marker to a four character hexadecimal display;
(iii) placing the four character hexadecimal display in a hold area;
(iv) incrementing the place marker by one;
(v) determining whether the place marker is greater than half of a record size;
(vi) displaying the hold area and exiting if the place marker is greater than half of the record size; and
(vii) returning to step (ii) if the place marker is not greater than half of the record size.

5. The method according to claim 1, wherein said step h) of formatting and displaying decimal data further comprises:
(i) setting a place marker to a first word in the record;
(ii) converting a word at a position indicated by the place marker to its decimal representation;
(iii) placing the decimal representation in a hold area;
(iv) incrementing the place marker by one;
(v) determining whether the place marker is greater than half of a record size;
(vi) displaying the hold area and exiting if the place marker is greater than half of the record size; and
(vii) returning to step (ii) if the place marker is not greater than half of the record size.

6. The method according to claim 1, wherein said step i) of formatting and displaying ASCII data further comprises:
(i) setting a place marker to a first word in the record;
(ii) converting a word at a position indicated by the place marker to its ASCII representation;
(iii) suppressing the ASCII representation of the word converted to ASCII in step (ii) if the ASCII representation lies within a non-printable ASCII character set;
(iv) placing the ASCII representation in a hold area;
(v) incrementing the place marker by one;
(vi) determining whether the place marker is greater than a record size;
(vii) displaying the hold area and exiting if the place marker is greater than the record size; and
(viii) returning to step (ii) if the place marker is not greater than the record size.

7. The method according to claim 6, wherein said step (iii) of suppressing comprises replacing the ASCII representation of the word converted to ASCII in step (ii) with another ASCII representation that lies within a printable ASCII character set, if the ASCII representation lies within the non-printable ASCII character set.

8. The method according to claim 7, wherein said another ASCII representation comprises a period, whereby all non-printable ASCII characters are displayed as a period.

9. A method for generating a report from a computer file containing unknown data, said method comprising the steps of:
a) creating an internal record table;
b) opening a user specified computer file;
b1) choosing by the user between binary, hexadecimal and decimal as a desired display format;
c) reading a record from the user specified computer file;
d) exiting if an end of file is encountered, else continuing;
e) formatting a report heading, if one is required;
f) formatting a report line;
g) displaying the report line to the user; and
h) returning to step b).

10. The method according to claim 9, wherein said step a) of creating an internal record table comprises:
(i) opening a data dictionary file;
(ii) searching a user specified record;
(iii) reading in the user specified record; and
(iv) loading all characteristics on the user specified record's data elements into the internal record table.

11. The method according to claim 9, wherein said step a) of creating an internal record table comprises:
(i) extracting a data element from each user format command;
(ii) loading each data element into an internal table;
(iii) searching the internal table for a user specified data element; and
(iv) building an internal record table with information related to the user specified data element.

12. The method according to claim 9, wherein said step a) of creating an internal record table comprises:
(i) parsing for user specified data element characteristics from each user format command;
(ii) loading each data element into an internal table;
(iii) building an internal report table entry with information related to the user specified data element.

13. The method according to claim 9, wherein said step a) of formatting a report heading comprises:
(i) writing a report heading at a top of page; and
(ii) formatting the report heading using a data element name stored in an internal report table.

14. A method for editing a computer file containing unknown data and generating a report on the computer file, said method comprising the steps of:
a) opening a user specified computer file;
b) choosing by the user between binary, hexadecimal, decimal as a desired display format;
c) reading a record from the user specified computer file;
d) proceeding with step k) if detecting an end of file;
f) formatting and displaying binary data if binary format was chosen in step b);
g) formatting and displaying hexadecimal data if hexadecimal format was chosen in step b);
h) formatting and displaying decimal data if decimal format was chosen in step b);
i) formatting and displaying ASCII data if binary, hexadecimal or decimal format was not chosen in step b);
j) returning to step c);
k) creating an internal record table;
l) opening a user specified computer file;
m) reading a record from the user specified computer file;

n) exiting if an end of file is encountered, else continuing;

o) formatting a report heading, if one is required;

p) formatting a report line;

q) displaying the report line to the user; and s) returning to step l).

15. The method according to claim 14, wherein said step k) of creating an internal record table comprises:

(i) opening a data dictionary file;

(ii) searching a user specified record;

(iii) reading in the user specified record; and (iv) loading all characteristics on the user specified record's data elements into the internal record table.

16. The method according to claim 14, wherein said step k) of creating an internal record table comprises:

(i) extracting a data element from each user format command;

(ii) loading each data element into an internal table;

(iii) searching the internal table for a user specified data element; and (iv) building an internal record table with information related to the user specified data element.

17. The method according to claim 14, wherein said step k) of creating an internal record table comprises:

(i) parsing for user specified data element characteristics from each user format command;

(ii) loading each data element into an internal table;

(iii) building an internal report table entry with information related to the user specified data element.

18. The method according to claim 14, wherein said step k) of formatting a report heading comprises:

(i) writing a report heading at a top of page; and (ii) formatting the report heading using a data element name stored in an internal report table.

19. The method according to claim 14, wherein said step f) of formatting and displaying binary data further comprises:

(i) setting a place marker to a first word in the record;

(ii) converting a word at a position indicated by the place marker to a sixteen bit binary display;

(iii) placing the sixteen bit binary display in a hold area;

(iv) incrementing the place marker by one;

(v) determining whether the place marker is greater than half of a record size;

(vi) displaying the hold area and exiting if the place marker is greater than half of the record size; and (vii) returning to step (ii) if the place marker is not greater than half of the record size.

20. The method according to claim 19, wherein said step (ii) of converting the word further comprises testing each bit in the word to determine whether the bit is a one or a zero.

21. The method according to claim 14, wherein said step g) of formatting and displaying hexadecimal data further comprises:

(i) setting a place marker to a first word in the record;

(ii) converting a word at a position indicated by the place marker to a four character hexadecimal display;

(iii) placing the four character hexadecimal display in a hold area;

(iv) incrementing the place marker by one;

(v) determining whether the place marker is greater than half of a record size;

(vi) displaying the hold area and exiting if the place marker is greater than half of the record size; and (vii) returning to step (ii) if the place marker is not greater than half of the record size.

22. The method according to claim 14, wherein said step h) of formatting and displaying decimal data further comprises:

(i) setting a place marker to a first word in the record;

(ii) converting a word at a position indicated by the place marker to its decimal representation;

(iii) placing the decimal representation in a hold area;

(iv) incrementing the place marker by one;

(v) determining whether the place marker is greater than half of a record size;

(vi) displaying the hold area and exiting if the place marker is greater than half of the record size; and (vii) returning to step (ii) if the place marker is not greater than half of the record size.

23. The method according to claim 14, wherein said step i) of formatting and displaying ASCII data further comprises:

(i) setting a place marker to a first word in the record;

(ii) converting a word at a position indicated by the place marker to its ASCII representation;

(iii) suppressing the ASCII representation of the word converted to ASCII in step (ii) if the ASCII representation lies within a non-printable ASCII character set;

(iv) placing the ASCII representation in a hold area;

(v) incrementing the place marker by one;

(vi) determining whether the place marker is greater than a record size;

(vii) displaying the hold area and exiting if the place marker is greater than the record size; and (viii) returning to step (ii) if the place marker is not greater than the record size.

24. The method according to claim 23, wherein said step (iii) of suppressing comprises replacing the ASCII representation of the word converted to ASCII in step (ii) with another ASCII representation that lies within a printable ASCII character set, if the ASCII representation lies within the non-printable ASCII character set.

25. The method according to claim 24, wherein said another ASCII representation comprises a period, whereby all non-printable ASCII characters are displayed as a period.

* * * * *